United States Patent
Wu et al.

(10) Patent No.: US 11,962,715 B2
(45) Date of Patent: Apr. 16, 2024

(54) TELEPHONE CALL INFORMATION COLLECTION AND RETRIEVAL

(71) Applicant: Citrix Systems, Inc., Ft. Lauderdale, FL (US)

(72) Inventors: Hao Wu, Nanjing (CN); Yu Xin, Nanjing (CN); Jianan Di, Nanjing (CN)

(73) Assignee: Citrix Systems, Inc., Ft. Lauderdale, FL (US)

(*) Notice: Subject to any disclaimer, the term of this patent is extended or adjusted under 35 U.S.C. 154(b) by 96 days.

(21) Appl. No.: 17/569,169

(22) Filed: Jan. 5, 2022

(65) Prior Publication Data
US 2023/0179702 A1    Jun. 8, 2023

Related U.S. Application Data
(63) Continuation of application No. PCT/CN2021/135243, filed on Dec. 3, 2021.

(51) Int. Cl.
| | |
|---|---|
| *H04M 3/00* | (2006.01) |
| *G06F 3/04817* | (2022.01) |
| *G10L 15/26* | (2006.01) |
| *H04M 1/656* | (2006.01) |
| *H04M 3/42* | (2006.01) |

(52) U.S. Cl.
CPC .... *H04M 3/42042* (2013.01); *G06F 3/04817* (2013.01); *G10L 15/26* (2013.01); *H04M 1/656* (2013.01); *H04M 2201/42* (2013.01)

(58) Field of Classification Search
CPC ............ H04M 3/42042; H04M 1/656; H04M 2201/42; G06F 3/04817; G10L 15/26
USPC .............. 379/211.01, 212.01, 201.01
See application file for complete search history.

(56) References Cited

U.S. PATENT DOCUMENTS

| | | | |
|---|---|---|---|
| 6,716,101 B1* | 4/2004 | Meadows ............. | H04W 4/029 455/457 |
| 6,885,874 B2* | 4/2005 | Grube .................. | H04W 84/08 455/518 |
| 7,013,148 B1* | 3/2006 | Ganesh ................. | H04W 64/00 455/456.1 |

(Continued)

FOREIGN PATENT DOCUMENTS

| | | |
|---|---|---|
| CN | 113727352 A | 11/2021 |

OTHER PUBLICATIONS

International Search Report and Written Opinion issued for International Application No. PCT/CN2021/135243 dated Jul. 29, 2022 (9 pages).

*Primary Examiner* — William J Deane, Jr.

(57) ABSTRACT

Techniques are provided for telephone call information collection and retrieval. A receiver device receives a telephone call from a caller device. The receiver device collects information associated with the telephone call and stores the information in a memory. Subsequently, the receiver device displays, via a graphical user interface, the telephone number of the caller device. The receiver device receives, via the graphical user interface, a user selection of the telephone number of the caller. In response to the user selection, the receiver device displays, via the graphical user interface, the information stored in the memory, including, for example, the start and end times of the telephone call, the location(s) of the receiver device during the telephone call, and text representing the audio of the call (e.g., speech-to-text conversion of at least a portion of the audio).

18 Claims, 8 Drawing Sheets

(56) References Cited

U.S. PATENT DOCUMENTS

| | | | | |
|---|---|---|---|---|
| 7,072,956 B2* | 7/2006 | Parupudi | ............... | H04L 63/102 |
| | | | | 709/223 |
| 9,109,904 B2* | 8/2015 | Forstall | ................ | G09B 29/007 |
| 2001/0048364 A1* | 12/2001 | Kalthoff | ................ | G01S 5/0009 |
| | | | | 340/8.1 |
| 2002/0085700 A1 | 7/2002 | Metcalf | | |
| 2002/0102989 A1* | 8/2002 | Calvert | ................ | H04W 64/00 |
| | | | | 455/457 |
| 2003/0069692 A1* | 4/2003 | Krasner | ................ | H04W 4/029 |
| | | | | 342/357.43 |
| 2003/0119522 A1* | 6/2003 | Barclay | .................. | H04W 4/02 |
| | | | | 455/415 |
| 2004/0054428 A1* | 3/2004 | Sheha | ................... | G06F 3/0484 |
| | | | | 700/56 |
| 2009/0029717 A1* | 1/2009 | Bates | ...................... | H04W 4/02 |
| | | | | 455/456.1 |
| 2009/0055379 A1 | 2/2009 | Murtagh | | |
| 2009/0086943 A1 | 4/2009 | Jain et al. | | |
| 2011/0090027 A1* | 4/2011 | Mangaiahgari | ......... | H01P 1/268 |
| | | | | 333/22 R |
| 2015/0087281 A1* | 3/2015 | Laux | .................. | H04M 15/745 |
| | | | | 455/415 |
| 2021/0329427 A1* | 10/2021 | Forstall | ............. | H04M 1/72436 |
| 2021/0357625 A1* | 11/2021 | Song | ....................... | G06T 13/40 |

\* cited by examiner

TELEPHONE CALL INFORMATION COLLECTION AND RETRIEVAL

RELATED APPLICATION

This application claims priority under 35 U.S.C. § 120 as a continuation of PCT Application No. PCT/CN2021/135243, entitled "TELEPHONE CALL INFORMATION COLLECTION AND RETRIEVAL" and filed Dec. 3, 2021. PCT Application No. PCT/CN2021/135243 is hereby incorporated herein by reference in its entirety.

BACKGROUND

Telephone service providers may provide caller identification information to electronic devices capable of receiving landline or wireless calls. For example, wireless providers provide the telephone number of the caller, which can be displayed to a user of a device, such as a smartphone, that receives the incoming call. Some telephones provide additional information based on the received telephone number, such as the name of the caller or other information associated with the number in contact information accessible by the telephone.

SUMMARY

One example provides a method of telephone call information collection and retrieval. The method includes receiving, by a receiver device, a telephone call from a caller device; collecting, by the receiver device, information associated with the telephone call, the information including a telephone number of the caller device, a start time of the telephone call, a location of the receiver device during the telephone call, and audio associated with a conversation conducted during the telephone call; storing, by the receiver device, the information in a memory; displaying, via a graphical user interface of the receiver device, the telephone number of the caller device; receiving, via the graphical user interface, a user selection of the telephone number of the caller device; and displaying, via the graphical user interface and in response to the user selection, the information stored in the memory.

At least some examples of the method include one or more of the following. The collecting of the information occurs for a user-selectable amount of time during the telephone call. The method further includes converting, by the receiver device, the audio to text, and storing the text in the memory. The method further includes displaying, via the graphical user interface and in response to the user selection, the text stored in the memory. The method further includes displaying, via the graphical user interface, a map indicating the location of the receiver device during the telephone call. The method further includes monitoring a user action taken on the receiver device after the telephone call is completed; and displaying, via the graphical user interface and in response to the user selection, an indication of the user action. The monitoring of the user action includes monitoring launch of an application on the receiver device; and the displaying of the indication of the user action includes displaying a description of and/or an icon associated with the application.

Another example provides a computer program product including one or more non-transitory machine-readable mediums having instructions encoded thereon that when executed by at least one processor cause a process to be carried out. The process includes receiving, by a receiver device, a telephone call from a caller device; collecting, by the receiver device, information associated with the telephone call, the information including a telephone number of the caller device, a time of the telephone call, a location of the receiver device during the telephone call, and audio associated with a conversation conducted during the telephone call; storing, by the receiver device, the information in a memory; and displaying, via a graphical user interface of the receiver device and after the telephone call is completed, the telephone number of the caller device and the information stored in the memory.

At least some examples of the computer program product include one or more of the following. The collecting of the information occurs for a user-selectable amount of time during the telephone call. The process includes converting, by the receiver device, the speech to text, and storing the text in the memory. The process includes displaying, via the graphical user interface and after the telephone call is completed, the text stored in the memory. The process includes displaying, via the graphical user interface, a map indicating the location of the receiver device during the telephone call. The process includes monitoring a user action taken on the receiver device after the telephone call is completed; and displaying, via the graphical user interface, an indication of the user action. The monitoring of the user action includes monitoring launch of an application on the receiver device; and the displaying of the indication of the user action includes displaying a description of and/or an icon associated with the application.

Yet another example provides a system including a storage and at least one processor operatively coupled to the storage, the at least one processor configured to execute instructions stored in the storage that when executed cause the at least one processor to carry out a process. The process includes receiving, by a receiver device, a telephone call from a caller device; collecting, by the receiver device, information associated with the telephone call, the information including a telephone number of the caller device, a start time of the telephone call, a location of the receiver device during the telephone call, and audio associated with a conversation conducted during the telephone call; storing, by the receiver device, the information in a memory; displaying, via a graphical user interface of the receiver device, the telephone number of the caller device; receiving, via the graphical user interface, a user selection of the telephone number of the caller device; and displaying, via the graphical user interface and in response to the user selection, the information stored in the memory.

At least some examples of the system include one or more of the following. The process includes converting, by the receiver device, the speech to text, and storing the text in the memory. The process includes displaying, via the graphical user interface and in response to the user selection, the text stored in the memory. The process includes displaying, via the graphical user interface, a map indicating the location of the receiver device during the telephone call. The process includes monitoring a user action taken on the receiver device after the telephone call is completed; and displaying, via the graphical user interface and in response to the user selection, an indication of the user action. The monitoring of the user action includes monitoring launch of an application on the receiver device; and the displaying of the indication of the user action includes displaying a description of and/or an icon associated with the application.

Other aspects, examples, and advantages of these aspects and examples, are discussed in detail below. It will be understood that the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

According to examples of the present disclosure, techniques for telephone call information collection and retrieval are provided. A receiver device receives a telephone call from a caller device. For example, the receiver device can be a telephone (e.g., a smartphone) that is capable of receiving the telephone call and other information provided by the telecommunications service (e.g., a telephone services provider or other telephone exchange). The receiver device then collects information associated with the telephone call. For example, the information can include a telephone number of the caller device, a start time of the telephone call, an end time of the telephone call, a location of the receiver device during the telephone call (including the location at the start and end of the call), and audio (e.g., speech) associated with at least a portion of a conversation conducted during the telephone call, among other things. The receiver device then stores the information in a memory. Subsequently, the receiver device displays, via a graphical user interface, the telephone number of the caller device, for example, in a list of telephone numbers of received calls. The receiver device receives, via the graphical user interface, a user selection of the telephone number of the caller device (e.g., the user chooses one of the telephone numbers from the list). In response to the user selection, the receiver device displays, via the graphical user interface, the information stored in the memory, including, for example, the start and end times of the telephone call, the location(s) of the receiver device during the telephone call, and text representing the audio of the call (e.g., speech-to-text conversion of at least a portion of the audio). The user can use this information to remember or otherwise recall the identity of the previous caller, such as when the user wishes to call the other party back but does not remember the other caller's telephone number. Further examples will be apparent in view of this disclosure.

Overview

Many telephones are capable of both storing call contact information as well as receiving the telephone number of the caller, which is provided by the telephone services provider. For example, some telephonic devices allow a user to enter names and corresponding telephone numbers of individuals or other entities into a contact list, which is stored for future access. If the recipient of the call does not recognize the telephone number or has not previously associated additional identifying information, such as the name of the caller, with the telephone number, then the recipient can enter the telephone number and other information, such as the name, into the contact list for future recall. Otherwise, if the telephone number is not already associated with a name in the contact list of the device, then the user may not recognize the identity of the caller until he or she answers the call and begins a conversation. Furthermore, if the user wishes to later call back another party for which the name has not been stored in the contact list, the user may not remember the telephone number. For example, a user may receive many phone calls from phone numbers which are not saved in the contact list, such as calls from a delivery service or a training center. Thus, if the user subsequently wishes to call the other party, the device may have no further identifying information to assist the user with recalling the correct number for that party.

To this end, techniques are disclosed for collecting information about calls that are received from unknown callers for subsequent user retrieval when user is searching for a telephone number that is not saved in the contact list of the receiver device. For example, the disclosed techniques provide information about a phone call including the text of the audio conversation during the call, the time or length of the call, and/or the action taken by the user after the call. This enables the user to associate the phone number with the caller if the telephone number and caller identification are not stored in the contact list.

In some examples, a receiver device (e.g., a smartphone or other telephonic device) receives a telephone call from an unknown caller. As used herein, an unknown caller is a caller for which no additional information (beyond the caller's telephone number) is available to identify the caller, such as a name. In other words, while the telephone number is known at the time the call is received, the name of the caller is unknown to the device receiving the call. Upon answering the incoming call, the receiver device collects information about the call, such as the time, location, and at least a portion of the voice conversation is recorded as an audio file in the device. For example, the first ten to 60 seconds of the conversation can be recorded, although it will be appreciated that any portion, or the entirety, of the conversation can be recorded. The amount of the conversation that is recorded can, in some examples, be user configurable. In some examples, the device may record only portions including speech and not record portions that are silent or may only record a pre-configured number of seconds of speech (excluding silent portions). In some examples, the speech is converted to text using a conventional speech-to-text analysis routine. The text can be recorded in addition to, or instead of, the audio recording of the conversation. In some examples, the device records the start time of the call, the end time of the call, the location of the device receiving the call, or any combination of these. The device can determine the location, for example, using the Global Positioning System (GPS) and/or Wi-Fi location information.

In some examples, after the call ends, the device monitors for a user action. The user action includes launching an application in the device or opening a webpage after a call ends, since these activities are likely to be associated with the previous call. For example, a trainer calls to request that the user cancel a scheduled online course in an educational application that is installed in the receiver device. The telephone number of the trainer is provided by the telephone exchange but the name of the trainer is not stored in the contact list of the receiver device. The user may launch the educational application after the phone call to cancel the scheduled course. The receiver device then stores the user action (if any) with the call information described above (e.g., the telephone number of the caller, the start and/or end time of the call, and the location of the receiver device during the call). The information can later be retrieved, via a graphical user interface, by a user selection of the telephone number from a list of telephone numbers received from unknown callers.

Example Communication System

Figure 1:
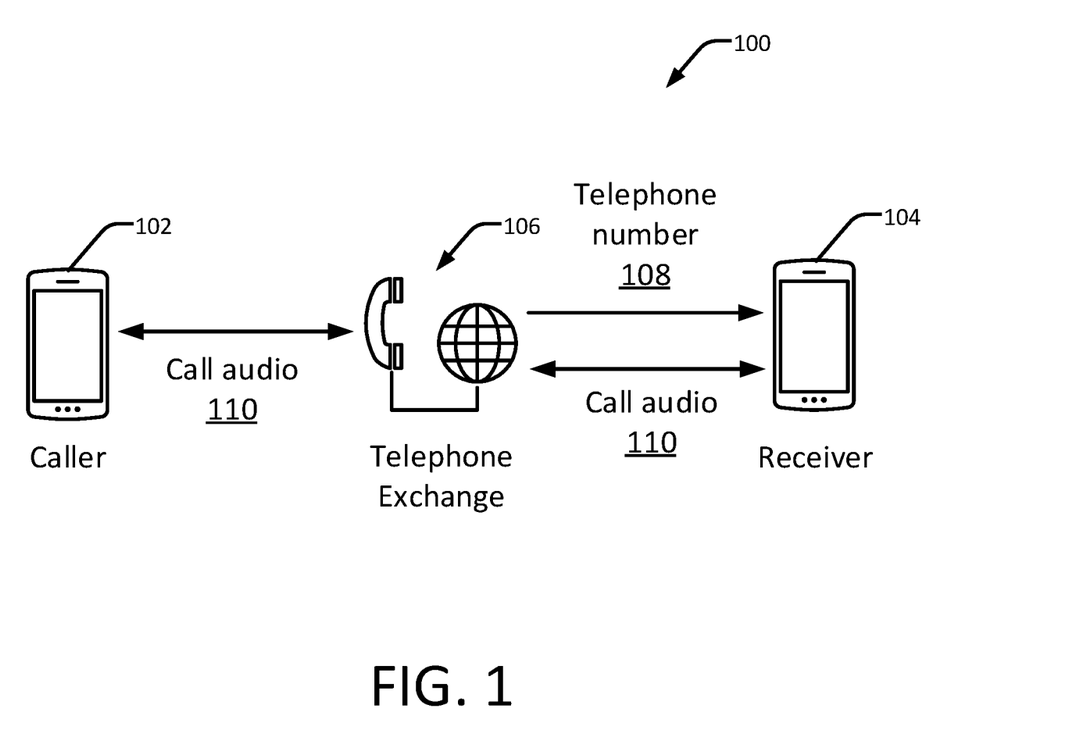
FIG. 1 is a schematic diagram of a communication system, in accordance with an example of the present disclosure.

FIG. 1 is a schematic diagram of a communication system 100, in accordance with an example of the present disclosure. The system 100 includes a caller device 102, a receiver device 104, and a telephone exchange 106. The caller device 102, the receiver device 104, or both can be a mobile telephone, a cellular telephone, or other device capable of receiving wired or wireless telephone calls. For example, the receiver device 104 can be a mobile device offering advanced computing capabilities, which are often referred to as smartphones. The telephone exchange 106 is a telecommunications system that provides services enabling the caller device 102 and the receiver device 104 to place and receive telephone calls between the devices. Generally, the telephone exchange 106 provides telecommunication services utilizing a telephone number 108 that uniquely identifies the caller device 102 and/or the receiver device 104 within the communication system 100. The telephone exchange 106 is configured to provide call audio 110 between the caller device 102 and the receiver device 104. The telephone exchange 106 is further configured to provide the telephone number 108 of the caller device 102 to the receiver device 104 when the call is placed.

Figure 2:
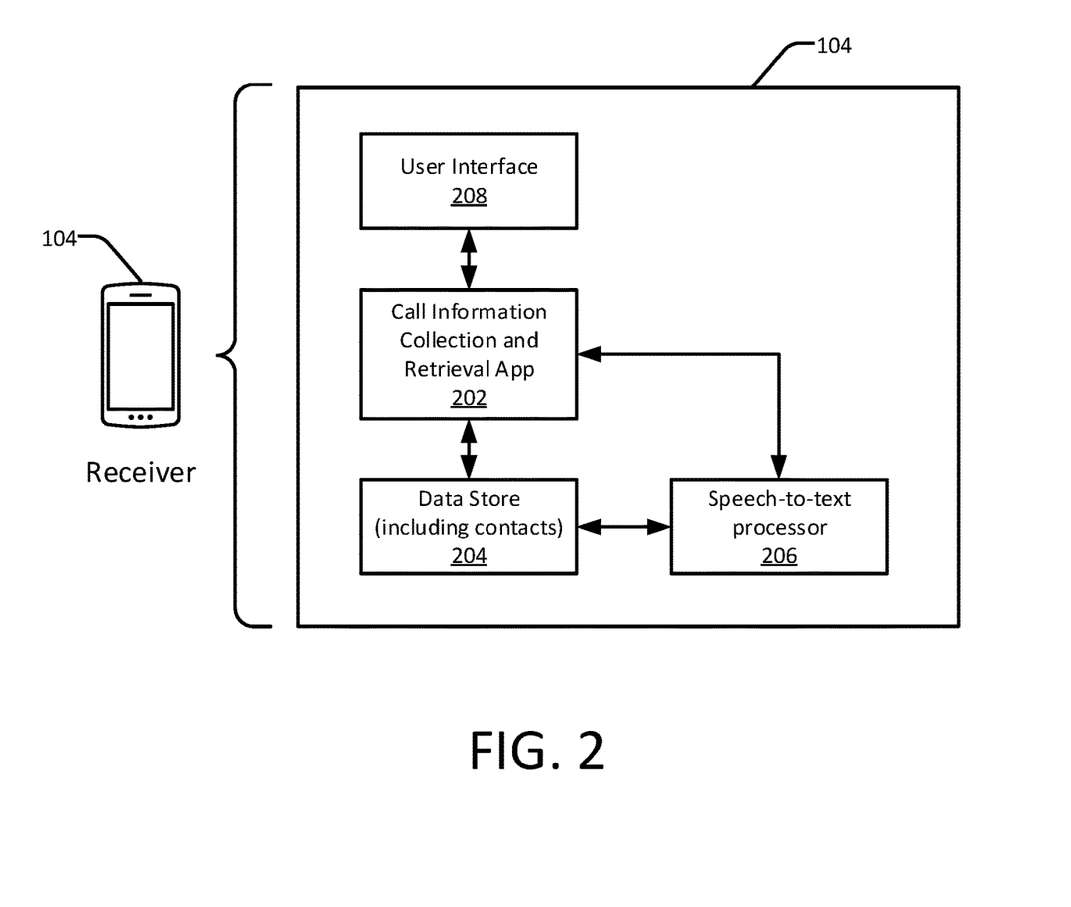
FIG. 2 is a block diagram of a receiver device of the communication system of FIG. 1, in accordance with an example of the present disclosure.

FIG. 2 is a block diagram of the receiver device 104, in accordance with an example of the present disclosure. The receiver device 104 includes a call information collection and retrieval application 202, a data store 204, a speech-to-text processor 206, and a user interface 208. The call information collection and retrieval application 202 is configured to process call information received from the caller device 102 and the telephone exchange 106, including the telephone number 108 and the call audio 110, as described in further detail with respect to FIGS. 3-7.

Example Contact List Information Collection Process

Figure 3:
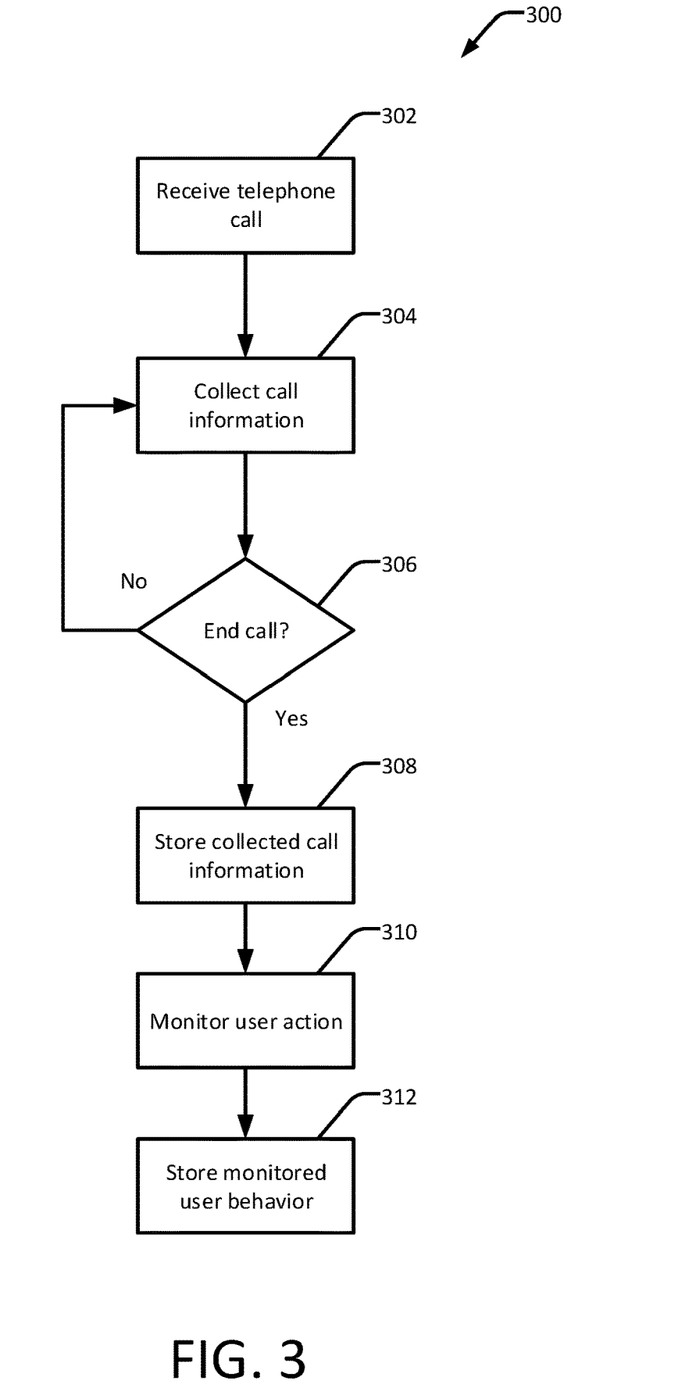
FIG. 3 is a flow diagram of a contact list information collection process, in accordance with an example of the present disclosure.

FIG. 3 is a flow diagram of a contact list information collection process 300, in accordance with an example of the present disclosure. The process 300 can be implemented, for example, in the call information collection and retrieval application 202 of the receiver device 104 of FIGS. 1 and 2. The process 300 includes receiving 302, by a receiver device, a telephone call from a caller device. The telephone call includes at least the telephone number 108 of the caller device. The process 300 further includes collecting 304, by the receiver device, information associated with the telephone call. For example, the receiver device can begin collecting the information when the incoming call rings or when the call is answered. The information includes the telephone number 108 of the caller device, a start time of the telephone call, a location of the receiver device during the telephone call, and audio associated with a conversation conducted during the telephone call. In some examples, the information includes an end time of the telephone call, a location of the receiver device at the start of the call, a location of the receiver device at the end of the call, or any combination of these. In some examples, the device determines the location using the Global Positioning System (GPS) and/or Wi-Fi location information. The collecting 304 of the information can continue for any amount of time. For example, the information, or portions of it, can be collected during the first ten to 60 seconds of the call, or until the call ends, whichever occurs first. The amount of time the collecting 304 occurs can, in some examples, be user-defined or otherwise configurable.

When the call ends 306, the process 300 further includes storing 308, by the receiver device, the information in a memory, such as the data store 204 of FIG. 2. The process 300 further includes monitoring 310 a user action taken on the receiver device after the telephone call is completed, and storing 312 the monitored user action, if any, in the memory. The user action can include, for example, launching an application on the receiver device or entering a Uniform Resource Locator (URL or another web address) into a web browser. In this example, the name of the application that is launched or the specific URL (or other web address) is stored in the memory.

Figure 4:
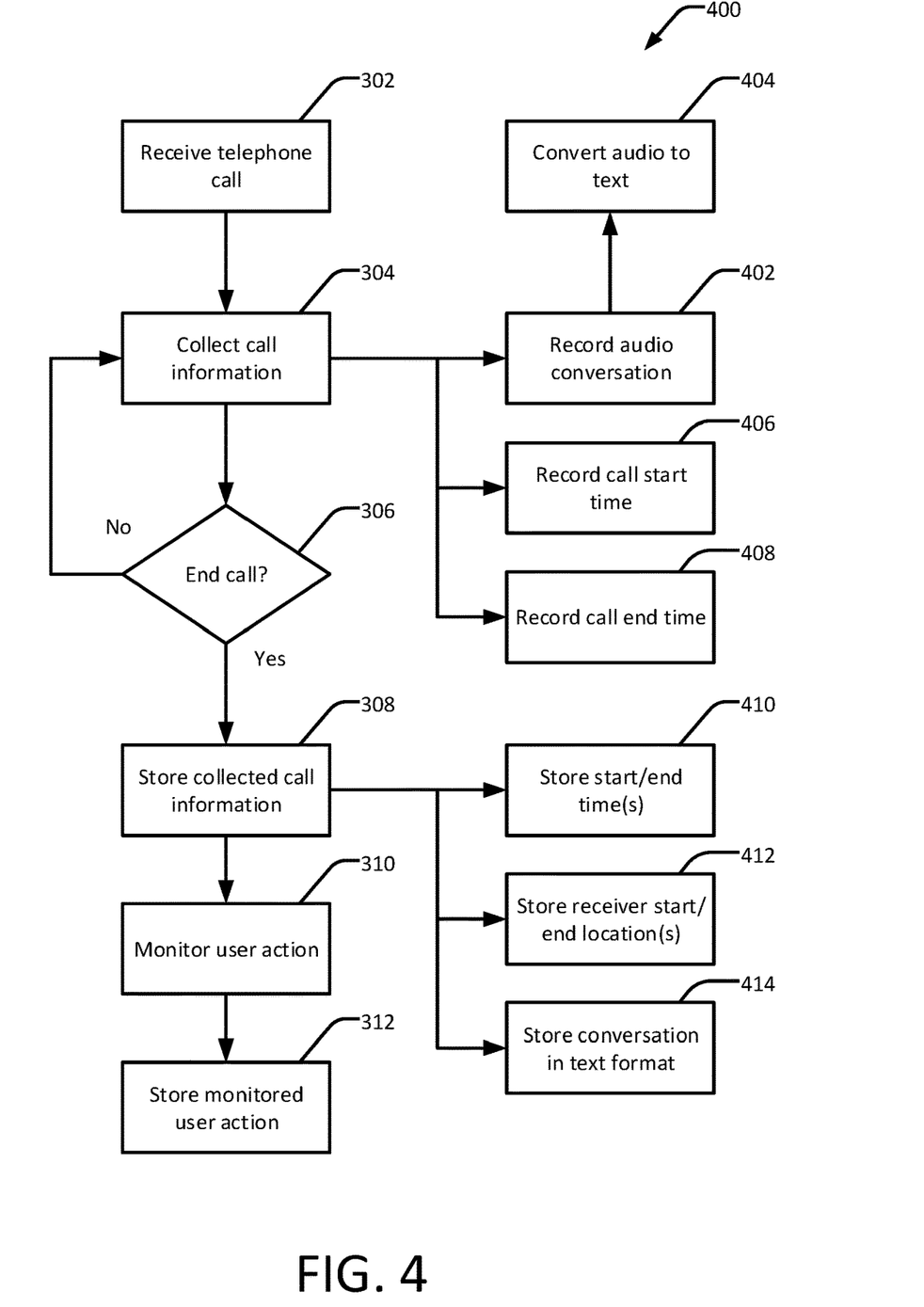
FIG. 4 is a flow diagram of another contact list information collection process, in accordance with an example of the present disclosure.

FIG. 4 is a flow diagram of another contact list information collection process 400, in accordance with an example of the present disclosure. The process 400 can be implemented, for example, in the call information collection and retrieval application 202 of the receiver device 104 of FIGS. 1 and 2. The process 400 is similar to the process 300 of FIG. 3, with some differences as follows. Collecting 304 the call information includes recording 402 the audio conversation of the call, recording 406 the start time of the call, and recording 408 the end time of the call. The process 400 further includes converting 404 the audio to text, such as by using the speech-to-text processor 206 of FIG. 2. Storing 308 the call information includes storing 410 the start/end time(s) of the call, storing 412 the location (including the start and end locations, if available) of the call, and storing 414 the conversation in text format (e.g., the output of the speech-to-text processor 206).

Figure 5:
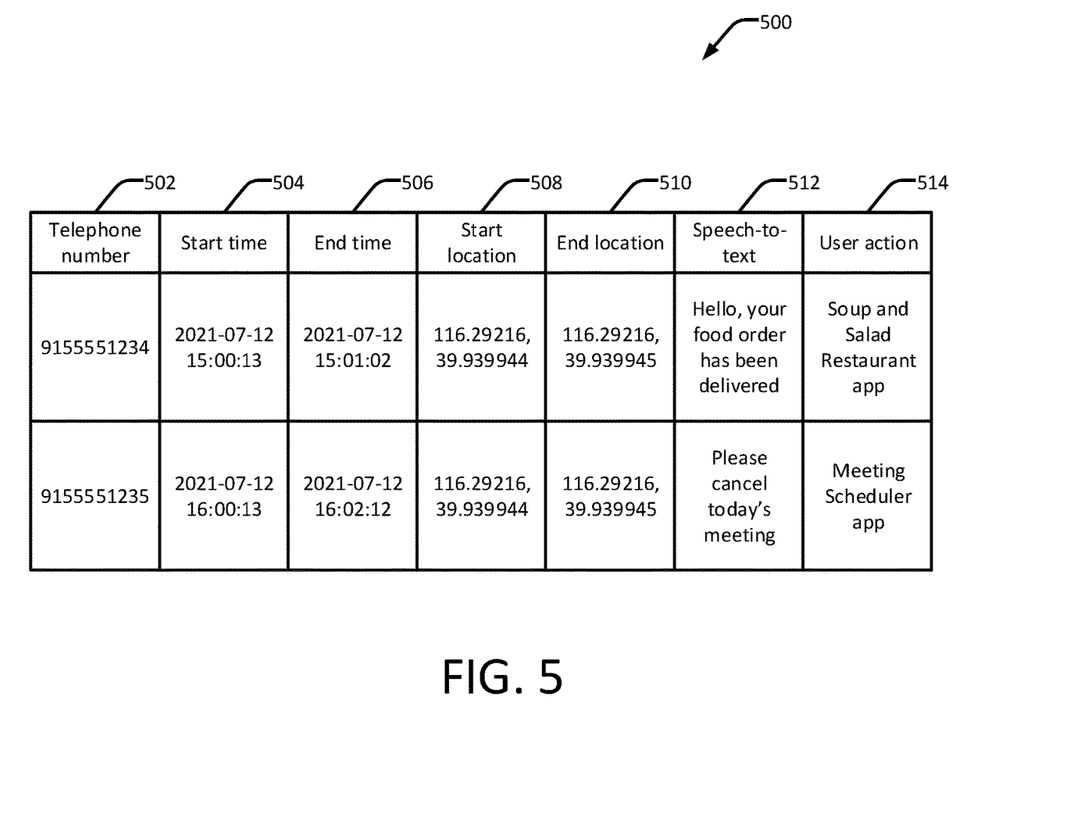
FIG. 5 is a table showing call information that is collected and stored by the receiver device of FIGS. 1 and 2, in accordance with an example of the present disclosure.

FIG. 5 is a table 500 showing call information that is collected and stored by the receiver device, in accordance with an example of the present disclosure. For each call received by the receiver device 104, the call information can include one or more telephone numbers 502, the start time 504 of a call associated with the respective telephone number, an end time 506 of the call, a start location 508 of the call (e.g., expressed as GPS coordinates or other localization data, such as city name, street address, etc.), an end location 510 of the call, text 512 of the call audio (e.g., speech in the call audio converted to text), and a user action 514 (e.g., post-call user activity, such as launch of an application in the receiver device 104 or entering of a URL into a browser of the receiver device 104). It will be understood that other types of data can be collected and stored, such as the location associated with the caller's telephone number or other caller identification information provided by the telephone exchange 106.

Example Contact List Management Process

Figure 6:
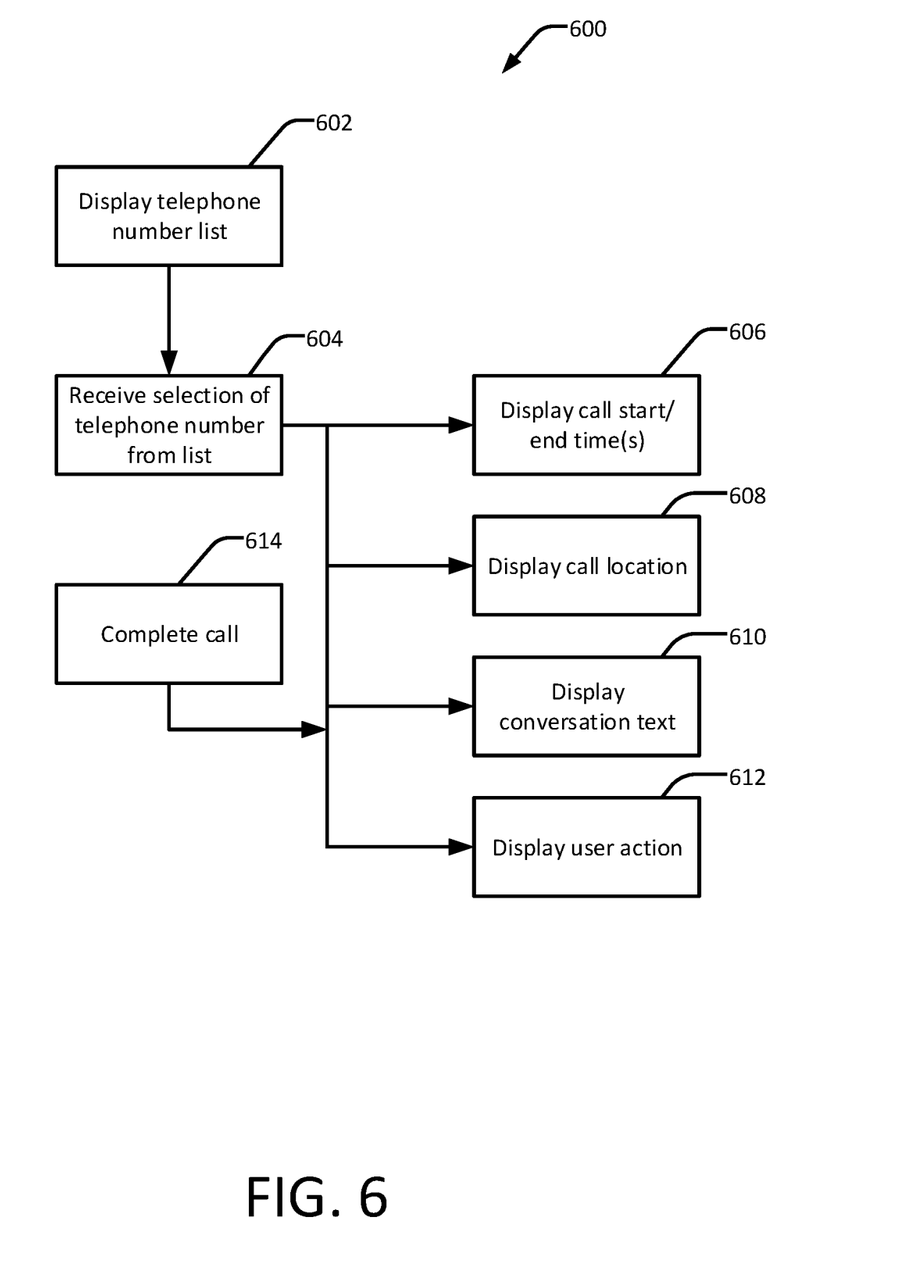
FIG. 6 is a flow diagram of a contact list management process, in accordance with an example of the present disclosure.

FIG. 6 is a flow diagram of a contact list management process 600, in accordance with an example of the present disclosure. The process 600 can be implemented, for example, in the call information collection and retrieval application 202 of the receiver device 104 of FIGS. 1 and 2. The process 600 includes displaying 602, via a graphical user interface of the receiver device (e.g., the user interface 208 of FIG. 2), a list of the telephone number(s) of the caller device(s) that were previously collected and stored (e.g., using the process 300 or 400 of FIGS. 3 and 4).

Figure 7A:
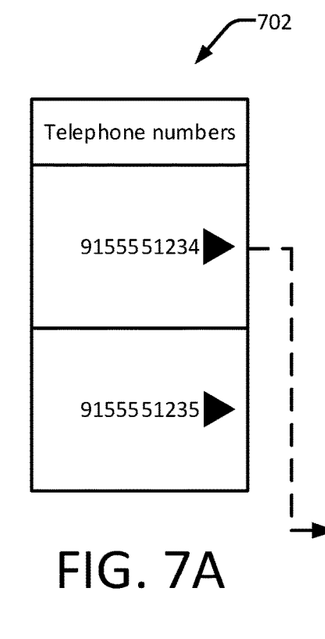
FIG. 7A shows a graphical user interface for displaying a list of telephone numbers, in accordance with an example of the present disclosure.

FIG. 7A shows a graphical user interface 702 for displaying the list of telephone numbers, in accordance with an example of the present disclosure. The graphical user interface 702 can be configured to display one or more of the telephone numbers of calls received by the receiver device 104. In some examples, the telephone numbers are not stored in the contact list of the receiver device 104. In other words, the telephone numbers displayed in the graphical user interface 702 represent calls received from unknown callers. Any of the telephone numbers in the graphical user interface 702 can be selected by the user for recalling the information collected by the receiver device during the corresponding telephone call.

The process 600 further includes receiving 604, via the graphical user interface, a user selection of one of the telephone numbers in the list. The process 600 further includes one or more of the following: displaying 606, via the graphical user interface and in response to the user selection, the information and the text associated with the selected telephone number as stored in the memory; displaying 608 the location of the receiver device during the corresponding telephone number (including the start and end locations); displaying 610 the text of the conversation corresponding to the telephone number; and displaying 612 an indication of the user action taken after the call was completed. In some examples, the displaying 608 of the location of the receiver device, the displaying 610 of the text of the conversation, and/or the displaying 612 of the indication of the user action can occur automatically after the telephone call is completed 614, without a user selection of the telephone number. In such examples, the location, text, and indication are related to the telephone number of the most recent telephone call.

Figure 7B:
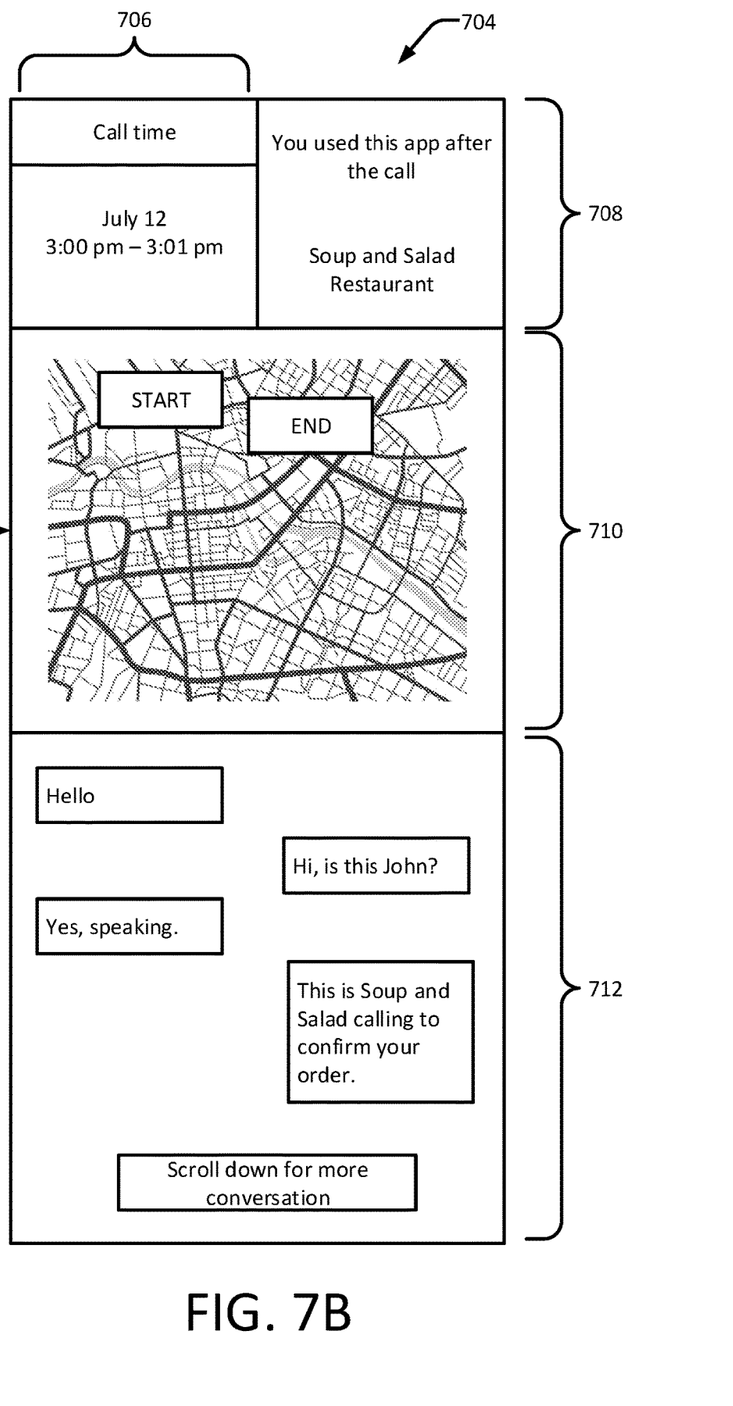
FIG. 7B shows a graphical user interface for displaying a call information, in accordance with an example of the present disclosure.

FIG. 7B further shows a graphical user interface 704 for displaying the call information, in accordance with an example of the present disclosure. The graphical user interface 704 can include the call time 706 (including the start and end time of the call), an indication of the user action 708 taken after the call was completed (e.g., an icon or text representing or otherwise describing an application that was launched or a URL/web page); a map 710 showing the location of the receiver device during the call (including the start and end locations); and the text 712 of the conversation.

In some examples, the call information can be shared with other applications, such as a contact list application or an application that provides call analytics.

Example Computing Device

Figure 8:
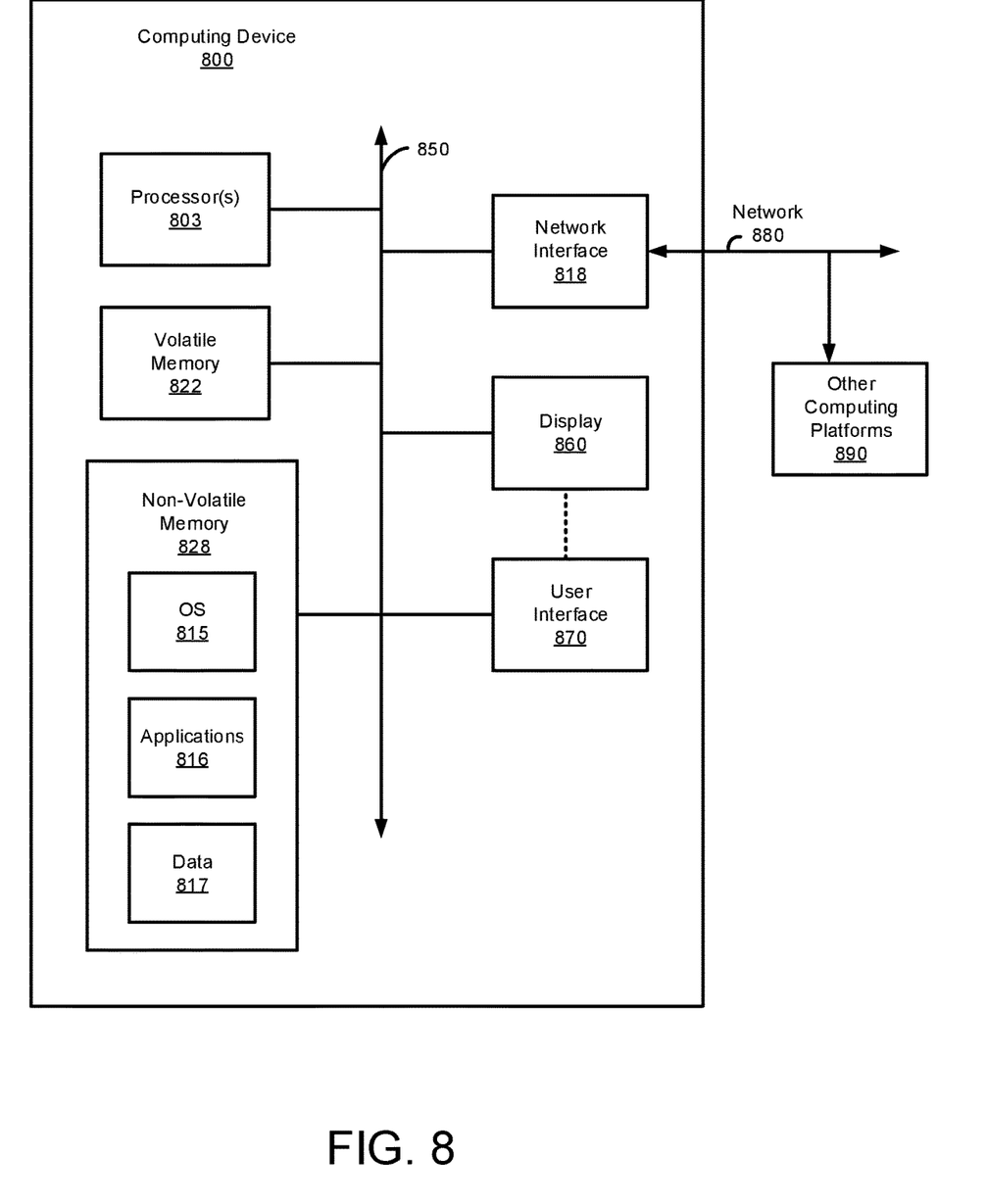
FIG. 8 is a block diagram of a computing device configured to implement various systems and processes in accordance with examples disclosed herein.

FIG. 8 is a block diagram of a computing device configured to implement various systems and processes in accordance with examples disclosed herein. In some examples, the system 800 can include a workstation, a laptop computer, a tablet, a mobile device, or any suitable computing or communication device. One or more components of the system 800, including the user interface 208, the call information collection and retrieval application 202, and the speech-to-text processor 206, can include or otherwise be executed using one or more processors 803, volatile memory (e.g., random access memory (RAM)) 822, non-volatile machine-readable mediums (e.g., a non-volatile memory 828), one or more network or communication interfaces 818, a user interface (UI) 870, a display 860, and a communications bus 850. The non-volatile (non-transitory) machine-readable mediums 828 can include: one or more hard disk drives (HDDs) or other magnetic or optical machine-readable storage media; one or more machine-readable solid state drives (SSDs), such as a flash drive or other solid-state storage media; one or more hybrid machine-readable magnetic and solid-state drives; and/or one or more virtual machine-readable storage volumes, such as a cloud storage, or a combination of such physical storage volumes and virtual storage volumes or arrays thereof. The user interface 870 can include one or more input/output (I/O) devices (e.g., a mouse, a keyboard, a microphone, one or more speakers, etc.). The display 860 can provide a graphical user interface (GUI) and in some cases, may be a touchscreen or any other suitable display device. The non-volatile memory 828 stores an operating system (OS), one or more applications, and data such that, for example, computer instructions of the operating system and the applications, are executed by processor(s) out of the volatile memory. In some examples, the volatile memory 822 can include one or more types of RAM and/or a cache memory that can offer a faster response time than a main memory. Data can be entered through the user interface 870. Various elements of the system 800 can communicate via the communications bus 850 or the network interface 818.

The computing device 800 can also be referred to as a client device, computing device, endpoint device, computer, or a computer system. The computing device 800 is shown as an example client device and can be implemented within any computing or processing environment with any type of physical or virtual machine or set of physical and virtual machines that can have suitable hardware and/or software capable of operating as described herein.

The non-volatile memory 828 stores an operating system (OS) 815, one or more applications or programs 816, and data 817. The OS 815 and the application 816 include sequences of instructions that are encoded for execution by processor(s) 803. Execution of these instructions results in manipulated data. Prior to their execution, the instructions can be copied to the volatile memory 822. In some examples, the volatile memory 822 can include one or more types of RAM and/or a cache memory that can offer a faster response time than a main memory. Data can be entered through the user interface 870 or received from the other I/O device(s), such as the network interface 818. The various elements of the device 800 described above can communicate with one another via the communications bus 850.

The processor(s) 803 can be implemented by one or more programmable processors to execute one or more executable instructions, such as a computer program, to perform the functions of the system. As used herein, the term "processor" describes circuitry, hardware, firmware, or software that performs a function, an operation, or a sequence of operations. The function, operation, or sequence of operations can be hard coded into the circuitry or a data storage device, or soft coded by way of instructions held in the storage device and executed by the circuitry. A processor can perform the function, operation, or sequence of operations using digital values and/or using analog signals. In some examples, the processor can be include one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory. The processor(s) 803 can be analog, digital or mixed. In some examples, the processor(s) 803 can be one or more local physical processors or one or more remotely located physical processors. A processor including multiple processor cores and/or multiple processors can provide functionality for parallel, simultaneous execution of instructions or for parallel, simultaneous execution of one instruction on more than one piece of data.

The network interfaces 818 can include one or more interfaces to enable the computing device 800 to access a computer network 880 such as a Local Area Network (LAN), a Wide Area Network (WAN), a Personal Area Network (PAN), or the Internet through a variety of wired and/or wireless connections, including cellular connections and Bluetooth connections. In some examples, the network 880 may allow for communication with other computing devices 890, to enable distributed computing. The network 880 can include, for example, one or more private and/or public networks over which computing devices can exchange data.

In described examples, the computing device 800 can execute an application on behalf of a user of a client device. For example, the computing device 800 can execute one or more virtual machines managed by a hypervisor. Each virtual machine can provide an execution session within which applications execute on behalf of a user or a client device, such as a hosted desktop session. The computing device 800 can also execute a terminal services session to provide a hosted desktop environment. The computing device 800 can provide access to a remote computing environment including one or more applications, one or more desktop applications, and one or more desktop sessions in which one or more applications can execute.

The foregoing description and drawings of various embodiments are presented by way of example only. These examples are not intended to be exhaustive or to limit the present disclosure to the precise forms disclosed. Alterations, modifications, and variations will be apparent in light of this disclosure and are intended to be within the scope of the present disclosure as set forth in the claims. For example, the processes disclosed herein each represent a sequence of acts in a particular example. Some acts are optional and, as such, can be omitted in accord with one or more examples. Additionally, the order of acts can be altered, or other acts can be added, without departing from the scope of the apparatus and methods discussed herein.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

What is claimed is:

1. A method of telephone call information collection and retrieval, the method comprising:
   receiving, by a receiver device, a telephone call from a caller device;
   collecting, by the receiver device, information associated with the telephone call, the information including a telephone number of the caller device, a start time of the telephone call, a location of the receiver device during the telephone call, and audio associated with a conversation conducted during the telephone call;
   storing, by the receiver device, the information in a memory;
   displaying, via a graphical user interface of the receiver device, the telephone number of the caller device;
   receiving, via the graphical user interface, a user selection of the telephone number of the caller device;
   displaying, via the graphical user interface and in response to the user selection, the information stored in the memory; and
   displaying, via the graphical user interface, a map indicating the location of the receiver device during the telephone call.

2. The method of claim 1, wherein the collecting of the information occurs for a user-selectable amount of time during the telephone call.

3. The method of claim 1, further comprising converting, by the receiver device, the audio to text, and storing the text in the memory.

4. The method of claim 3, further comprising displaying, via the graphical user interface and in response to the user selection, the text stored in the memory.

5. The method of claim 1, further comprising:
   monitoring a user action taken on the receiver device after the telephone call is completed; and
   displaying, via the graphical user interface and in response to the user selection, an indication of the user action.

6. The method of claim 5, wherein:
   monitoring the user action includes monitoring launch of an application on the receiver device; and displaying the indication of the user action includes displaying a description of and/or an icon associated with the application.

7. A computer program product including one or more non-transitory machine-readable mediums having instructions encoded thereon that when executed by at least one processor cause a process to be carried out, the process comprising:
- receiving, by a receiver device, a telephone call from a caller device;
- collecting, by the receiver device, information associated with the telephone call, the information including a telephone number of the caller device, a time of the telephone call, a location of the receiver device during the telephone call, and audio associated with a conversation conducted during the telephone call;
- storing, by the receiver device, the information in a memory;
- displaying, via a graphical user interface of the receiver device and after the telephone call is completed, the telephone number of the caller device and the information stored in the memory; and
- displaying, via the graphical user interface, a map indicating the location of the receiver device during the telephone call.

8. The computer program product of claim 7, wherein the collecting of the information occurs for a user-selectable amount of time during the telephone call.

9. The computer program product of claim 7, wherein the process comprises converting, by the receiver device, the speech to text, and storing the text in the memory.

10. The computer program product of claim 9, wherein the process comprises displaying, via the graphical user interface and after the telephone call is completed, the text stored in the memory.

11. The computer program product of claim 7, wherein the process comprises:
- monitoring a user action taken on the receiver device after the telephone call is completed; and
- displaying, via the graphical user interface, an indication of the user action.

12. The computer program product of claim 11, wherein:
monitoring the user action includes monitoring launch of an application on the receiver device; and
displaying the indication of the user action includes displaying a description of and/or an icon associated with the application.

13. A system comprising:
a storage; and
at least one processor operatively coupled to the storage, the at least one processor configured to execute instructions stored in the storage that when executed cause the at least one processor to carry out a process comprising:
- receiving, by a receiver device, a telephone call from a caller device;
- collecting, by the receiver device, information associated with the telephone call, the information including a telephone number of the caller device, a start time of the telephone call, a location of the receiver device during the telephone call, and audio associated with a conversation conducted during the telephone call;
- storing, by the receiver device, the information in a memory;
- displaying, via a graphical user interface of the receiver device, the telephone number of the caller device;
- receiving, via the graphical user interface, a user selection of the telephone number of the caller device;
- displaying, via the graphical user interface and in response to the user selection, the information stored in the memory;
- monitoring a user action taken on the receiver device after the telephone call is completed; and
- displaying, via the graphical user interface and in response to the user selection, an indication of the user action.

14. The system of claim 13, wherein the process comprises converting, by the receiver device, the speech to text, and storing the text in the memory.

15. The system of claim 14, wherein the process comprises displaying, via the graphical user interface and in response to the user selection, the text stored in the memory.

16. The system of claim 13, wherein the process comprises displaying, via the graphical user interface, a map indicating the location of the receiver device during the telephone call.

17. The system of claim 13, wherein the process comprises:
storing the user action taken on the receiver device after the telephone call is completed with the information associated with the telephone call.

18. The system of claim 17, wherein:
monitoring the user action includes monitoring launch of an application on the receiver device; and
displaying the indication of the user action includes displaying a description of and/or an icon associated with the application.

* * * * *